United States Patent
Dries et al.

(10) Patent No.: US 10,308,754 B2
(45) Date of Patent: Jun. 4, 2019

(54) COMPOSITION

(71) Applicant: Huntsman Petrochemical LLC, The Woodlands, TX (US)

(72) Inventors: Geert Lodewijk Dries, Zonhoven (BE); Robert Allison Grigsby, Jr., Spring, TX (US); Ernest Lee Rister, Jr., Round Rock, TX (US); Eugene P. Wiltz, Jr., The Woodlands, TX (US)

(73) Assignee: HUNTSMAN PETROCHEMICAL LLC, The Woodlands, TX (US)

( * ) Notice: Subject to any disclaimer, the term of this patent is extended or adjusted under 35 U.S.C. 154(b) by 197 days.

(21) Appl. No.: 14/420,915

(22) PCT Filed: Jul. 10, 2013

(86) PCT No.: PCT/EP2013/064519
§ 371 (c)(1),
(2) Date: Feb. 11, 2015

(87) PCT Pub. No.: WO2014/026802
PCT Pub. Date: Feb. 20, 2014

(65) Prior Publication Data
US 2015/0191564 A1  Jul. 9, 2015

Related U.S. Application Data

(60) Provisional application No. 61/683,957, filed on Aug. 16, 2012.

(30) Foreign Application Priority Data

Aug. 28, 2012 (EP) .................................... 12181977

(51) Int. Cl.
| | | |
|---|---|---|
| C08G 18/08 | (2006.01) | |
| C08G 18/48 | (2006.01) | |
| C08G 18/66 | (2006.01) | |
| C08G 18/76 | (2006.01) | |
| C08G 18/30 | (2006.01) | |
| C08G 18/32 | (2006.01) | |
| C08G 101/00 | (2006.01) | |

(52) U.S. Cl.
CPC ........... *C08G 18/14* (2013.01); *C08G 18/302* (2013.01); *C08G 18/3228* (2013.01); *C08G 18/485* (2013.01); *C08G 18/4837* (2013.01); *C08G 18/6685* (2013.01); *C08G 18/7664* (2013.01); *C08G 18/7671* (2013.01); *C08G 2101/0058* (2013.01); *C08G 2101/0083* (2013.01)

(58) Field of Classification Search
CPC .. C08G 18/14; C08G 18/302; C08G 18/3228; C08G 18/4837; C08G 18/485; C08G 18/6685; C08G 18/7664; C08G 18/7671; C08G 2101/0058; C08G 2101/0083
See application file for complete search history.

(56) References Cited

U.S. PATENT DOCUMENTS

| | | |
|---|---|---|
| 5,700,846 A | 12/1997 | Grigsby, Jr. et al. |
| 2001/0023263 A1 | 9/2001 | Bruchmann et al. |
| 2003/0158279 A1 | 8/2003 | Becker et al. |
| 2006/0141236 A1 | 6/2006 | Nakamura et al. |
| 2008/0090922 A1 | 4/2008 | Vedage et al. |
| 2010/0113634 A1* | 5/2010 | Tokumoto ............ C08G 18/161 521/115 |
| 2011/0009512 A1 | 1/2011 | Grigsby, Jr. et al. |
| 2012/0041088 A1* | 2/2012 | Ishida ................. C08G 18/3265 521/129 |
| 2012/0184639 A1 | 7/2012 | Haas et al. |
| 2012/0271026 A1 | 10/2012 | Barman et al. |

FOREIGN PATENT DOCUMENTS

| | | |
|---|---|---|
| CN | 101622292 A | 1/2010 |
| CN | 101688103 A | 3/2010 |
| CN | 101977977 A | 2/2011 |
| DE | 10 003157 A | 8/2001 |
| DE | 10 2009 047846 A | 3/2011 |
| EP | 902038 A | 3/1999 |
| EP | 1 428 847 A | 6/2004 |
| EP | 1914254 A | 4/2008 |
| EP | 2116559 A1 | 11/2009 |
| JP | 11279254 A | 10/1999 |
| JP | 2000159853 A | 6/2000 |
| JP | 2006182825 A | 7/2006 |
| JP | 2007022955 A1 | 2/2007 |
| JP | 2008111118 A | 5/2008 |
| JP | 2008239972 A | 10/2008 |
| JP | 2009019120 A | 1/2009 |
| JP | 2009534417 A | 9/2009 |
| JP | 2011515540 A | 5/2011 |
| JP | 5080969 B | 11/2012 |
| JP | 2013506722 A | 2/2013 |
| JP | 2013516539 A | 5/2013 |
| WO | 2001/055242 A | 8/2001 |
| WO | 2005097728 A | 10/2005 |
| WO | 2007124358 A | 11/2007 |
| WO | 2008108280 A | 9/2008 |
| WO | 2009/117479 A | 9/2009 |
| WO | WO-2010123118 A1 * | 10/2010 ......... C08G 18/3265 |
| WO | 2011038846 A | 4/2011 |
| WO | 2011/084865 A | 7/2011 |
| WO | 2011084865 A | 7/2011 |

* cited by examiner

*Primary Examiner* — John M Cooney
(74) *Attorney, Agent, or Firm* — Huntsman Petrochemical LLC; Lewis Craft

(57) ABSTRACT

An isocyanate reactive composition comprising
At least one component selected from the group consisting of a polyether polyol, a polyester polyol, a polyether polyamide and a polyester polyamide;
one or more amine components, each of said amine components having a given structure.
In some embodiments, the average number of nitrogen atoms of said amine components is in the range of 5 to 10.

12 Claims, No Drawings

COMPOSITION

CROSS-REFERENCE TO RELATED APPLICATIONS

This application is the National Phase of International Application PCT/EP2013/064519 filed Jul. 10, 2013 which designated the U.S. and which claims priority to E.P. Application Serial No. 12181977.5 filed Aug. 28, 2012 and U.S. application Ser. No. 61/683,957 filed Aug. 16, 2012. The noted applications are incorporated herein by reference.

The present invention relates to isocyanate reactive compositions and methods to reduce the amount of aldehydes and/or dimethylformamide emitted from polyurethane foams by using said isocyanate reactive compositions.

Polyurethane and polyurea materials are well known in the art. Polyurethane and polyurea foams, in particular so-called flexible polyurethane and polyurea foams, are used in a multitude of applications.

More and more, the emission of components, such as in particular aldehyde components and dimethylformamide, is seen as a disadvantage.

Various attempts have been made to integrate so-called scavengers in the polyurethane foam. As an example DE10003157A1 discloses polymeric polyethylene imines being dissolved in a solvent, after which the solution is sucked into the foam structure. After drying or evaporation of the solvent, the polymeric molecules remain in the foam structure and act as aldehyde scavengers.

The process applying these polymers is cost and labor intensive, a significant amount of scavenging polymer is needed and the polymers are not necessarily all bonded to the chemical polyurethane or polyurea structure.

WO2009/117479 discloses a method comprising adding a primary amine containing compound to a tertiary amine catalyst and thereby reducing the quantity of formaldehyde in said tertiary amine catalyst by at least 50%. The aim of WO2009/117479 is to reduce the aldehyde formation within the catalyst and from that using the CERTIPUR standard test method to quantify the formaldehyde in foams.

Nowadays, the standards and regulations for emissions from polyurethane foam have become more stringent, especially within the automotive industry. The requirements within the automotive industry only allow very low emissions or almost no emissions of aldehydes, such as formaldehyde, and dimethylformamide from these polyurethane foams. Instead of using the CERTIPUR standard test method, a more stringent test method has to be used, namely the VDA 276 test method. Up to now, none of the state of the art methods is suitable to achieve very low to almost no aldehyde emissions from these polyurethane foams when using the VDA 276 test method. Some automotive OEM's specify formaldehyde emissions lower than 30 μg/m$^3$ for 1 kg foam measured according to the VDA 276 test method.

It is an object of the present invention to provide a method to ease the integration of scavengers for aldehydes, in particular for formaldehyde and/or acetaldehyde in a polyurethane or polyurea material, in particular a polyurethane or polyurea foamed structure.

It is further an object of the present invention to provide a selection of amine components suitable for use as scavengers for aldehydes, in particular for formaldehyde in a polyurethane or polyurea material. And at the same time keeping the Total VOC (TVOC) emissions measured according to VDA 278 from these foams low.

It was surprisingly seen that only the use of a selection of certain amine components in a predefined concentration range are capable of reducing the emission of aldehydes from a polyurethane or polyurea material such that the emission values for aldehydes fulfill the requirements set up by the automobile industry and thereby using the VDA 276 standard test method.

According to a first aspect of the present invention, a composition is provided, the composition comprising
  at least one component selected from the group consisting of a polyether polyol, a polyester polyol, a polyether polyamine and a polyester polyamine;
  one or more components, each of said amine components having a structure according to one of the formulae

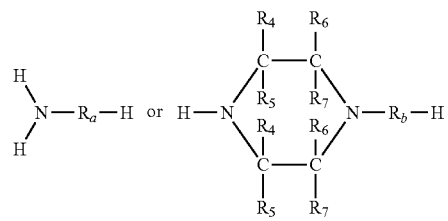

each of Ra and Rb independently being a random sequence of units R1, R2 and/or R3, for which
R1 being

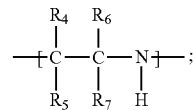

R2 being

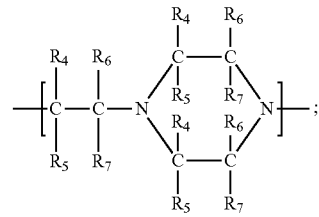

R3 being

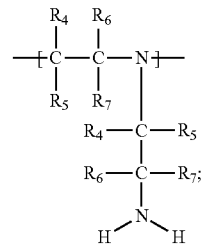

each of said R4, R5, R6 and R7 individually are —H or —CH$_3$;
Wherein Ra is comprising 3 to 17 nitrogen atoms, Rb is comprising 2 to 16 nitrogen atoms and
Wherein the amount of the one or more amine components in the composition is between 0.05% w to 1.0% w calculated on the total weight of the composition.

According to some embodiments, the average number of nitrogen atoms of said one or more amine components is in the range of 5 to 10.

The average number of nitrogen atoms is calculated according to the following definition:

$F = \Sigma Vi*(fi)^2 / \Sigma Vi*fi$, wherein

Vi = volume fraction of component i;
fi = nitrogen atoms in component i.

The compositions according to the invention may also be referred to as isocyanate reactive compositions, suitable to react with the isocyanate groups of e.g. polyisocyanate components. This reaction may result in polyurea or polyurethane materials.

According to some embodiments, the average number of nitrogen atoms of said one or more amine components may be in the range 5 to 8.

A typical average is between 6.5 and 7.5, e.g. about 7.

One or more amine components may comprise at least two, and preferably more than two amines according to said formulae. This may add up to 10 or more different amines, all having a structure according to one of said formulae. These at least two, and preferably more than two amines may be referred to as amine mixture.

It was found that of the one or more amine components with formulae as set out above, and when used in a process of providing PU foam by reacting an isocyanate reactive composition, comprising the one or more amine components, with a polyisocyanate component, act as a scavenger for aldehyde components (such as formaldehyde, acetaldehyde and propionaldehyde), and optionally also as for dimethylformamide (DMF). The one or more amine components with formulae as set out above itself can easily be included in the chemical structure of the polyurethane, as the primary and secondary amines are significantly reactive to the isocyanate groups of the polyisocyanate. As such the one or more amine components with formulae set out above are bond in the foam, while they influence little or even not the chemical and physical properties of the foam, seen its low molecular weight and the little amount that might be used.

According to preferred embodiments, the one or more amine components with formulae as set out above has at least one primary amine group and at least one secondary amine group. More preferable the one or more amine components has at least one component which has at least two primary amine groups and at least one secondary amine group According to alternative embodiments, the one or more amine components with formulae as set out above has at least two secondary amine groups.

As the one or more amine components with formulae as set out above is part of a reaction mixture suitable to provide polyurea or polyurethane, the foam, once made, need not to be post treated, such as by impregnation, to build in aldehyde scavenging properties in the foam.

In preferred embodiments, the total weight of the one or more amine components all together may provide 0.1 to 1% w or even 0.2 to 0.7% w of said composition according to the invention.

According to some embodiments, all R4-, R5-, R6- and R7-groups may be hydrogen.

As such a composition is provided, which composition comprises

At least one component selected from the group consisting of a polyether polyol, a polyester polyol, a polyether polyamine and a polyester polyamine;

one or more amine components, each of said amine components having a structure according to one of the formulae

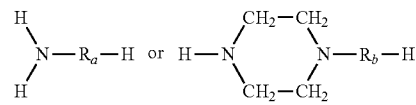

wherein each of Ra and Rb independently being a random sequence of units R1, R2 and/or R3, for which
R1 being

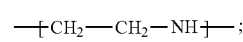

R2 being

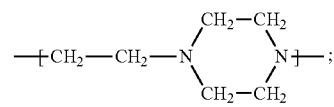

R3 being

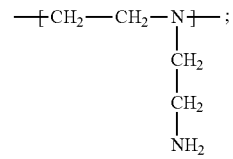

Wherein Ra is comprising 3 to 17 nitrogen atoms and Rb is comprising 2 to 16 nitrogen atoms, and Wherein the amount of the one or more amine components in the composition is between 0.05% w to 1.0% w calculated on the total weight of the composition.

According to some embodiments, the average number of nitrogen atoms of said one or more amine components is in the range of 5 to 10.

According to some embodiments, the one or more amine components may be a mixture comprising triethylene tetramines (TETA) and/or tetraethylene pentamines (TEPA) and/or pentaethylene hexamines (PEHA) and/or hexaethylene heptamines (HEHA) and/or heptaethylene octamines (HEOA) and/or octaethylene nonamines (OENO) and/or higher polyethylene amines.

According to some embodiments, the one or more amine components may be triethylene tetramines (TETA) and/or tetraethylene pentamines (TEPA). In these embodiments, and in particular where only triethylene tetramines (TETA) or only tetraethylene pentamines (TEPA) are included in the composition according to the invention, the one amine components may provide 0.1 to 1% w or even 0.2 to 0.7% w of said composition according to the invention.

This mixture typically further comprises amine components with in total 9 to 18 nitrogen atoms in its structure.

The mixture may be obtained by reacting ethylene dichloride (EDC) with ammonia at elevated pressure and temperatures. This mixture is than neutralized with caustic after which a distillation can separate the various amine components from the mixture.

The composition according to the invention has the further advantage that it is provided as a liquid under ambient conditions, facilitating the addition of this composition into a reactive mixture suitable to provide polyurethane or polyurea foam.

According to a second aspect of the present invention, a method for reducing the emission of formaldehyde and/or acetaldehyde from a polyurethane or polyurea foam is provided, the method using one or more amine components as an additive in a reaction mixture to produce said polyurethane or polyurea foam, each of said amine components having a structure according to one of the formulae

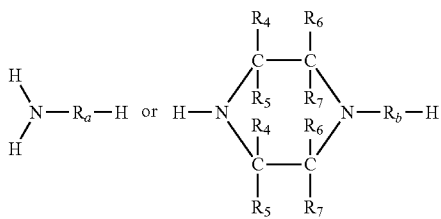

each of Ra and Rb independently being a random sequence of units R1 R2 and/or R3, for which
R1 being

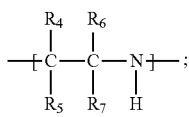

R2 being

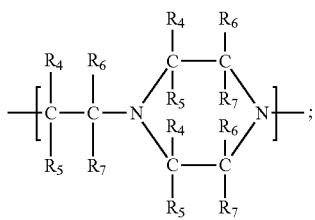

R3 being

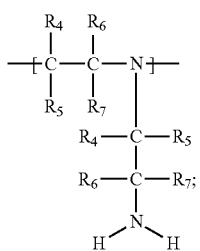

each of said R4, R5, R6 and R7 individually are —H or —CH$_3$;
Wherein Ra is comprising 3 to 17 nitrogen atoms, Rb is comprising 2 to 16 nitrogen atoms, and
Wherein the amount of the one or more amine components in the reaction mixture is between 0.05% w to 0.50% w calculated on the total weight of the reaction mixture.

According to embodiments, the reaction mixture suitable for making polyurethane or polyurea foam comprises:
- at least an isocyanate component, and
- at least an isocyanate reactive component comprising reactive hydrogen atoms and selected from a polyether polyol, a polyester polyol, a polyether polyamine and/or a polyester polyamine, and
- at least one or more amine components according to the invention, and
- catalysts selected from blowing and/or gelling catalysts, and
- Optionally fire retardants, antioxidants, surfactants, physical or chemical blowing agents, fillers, pigments, or any other typical additives used in polyurethane materials According to some embodiments of the invention, the average number of nitrogen atoms of said one or more amine components is in the range of 5 to 10.

It is understood that the method further comprises reacting said reaction mixture to provide a polyurethane or polyurea foam.

According to some embodiments of the invention, the one or more amine components may be amine components with formula

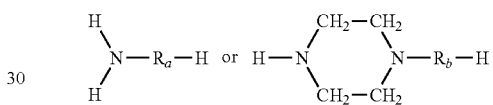

wherein each of Ra and Rb independently being a random sequence of units R1, R2 and/or R3, for which
R1 being

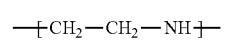

R2 being

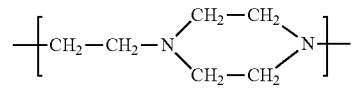

R3 being

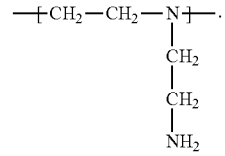

According to preferred embodiments, the total weight of the one or more amine components all together is 0.10% w to 0.35% w of the reaction mixture to produce said polyurethane or polyurea foam.

According to some embodiments of the invention, said one or more amine components may be provided to the reaction mixture as part of the isocyanate reactive composition further comprising said at least one polyisocyanate reactive component.

The at least one polyisocyanate reactive component may be e.g. a polyether polyol, a polyester polyol, a polyether polyamine, a polyester polyamine or combinations thereof. Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether polyols obtained by ring-opening copolymerisation of alkylene oxides, such as ethylene oxide and/or propylene oxide, with isocyanate-reactive initiators of functionality 2 to 8. Preferably the polyether polyols are based on propylene oxide, optionally in combination with up to 20 wt % (based on total alkylene oxides) of ethylene oxide. Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebacic acid, and the like can be given.

The polyisocyanate component used in the present invention may comprise any number of polyisocyanates, including but not limited to, toluene diisocyanates (TDI), diphenylmethane diisocyanate (MDI)-type isocyanates, and prepolymers of these isocyanates.

The diphenylmethane diisocyanate (MDI) used in the present invention can be in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, or any of their derivatives having a urethane, isocyanurate, allophonate, biuret, uretonimine, uretdione and/or iminooxadiazinedione groups and mixtures of the same.

Examples of other suitable polyisocyanates are tolylene diisocyanate (TDI), hexamethylene diisocyanate (HDI), isophorone diisocyanate (IPDI), butylene diisocyanate, trimethylhexamethylene diisocyanate, dicyclohexylmethane diisocyanate (H12MDI), di(isocyanatocyclohexyl)methane, isocyanatomethyl-1,8-octane diisocyanate and tetramethylxylene diisocyanate (TMXDI).

Semi-prepolymers and prepolymers which may be obtained by reacting polyisocyanates with compounds containing isocyanate-reactive hydrogen atoms may be used. Examples of compounds containing isocyanate-reactive hydrogen atoms include alcohols, glycols or even relatively high molecular weight polyether polyols and polyester polyols, mercaptans, carboxylic acids, amines, urea and amides. Examples of suitable prepolymers are reaction products of polyisocyanates with monohydric or polyhydric alcohols.

The prepolymers are prepared by conventional methods, e.g. by reacting polyhydroxyl compounds which have a molecular weight of from 400 to 5000, in particular mono- or polyhydroxyl polyethers, optionally mixed with polyhydric alcohols which have a molecular weight below 400, with excess quantities of polyisocyanates, for example aliphatic, cycloaliphatic, araliphatic, aromatic or heterocyclic polyisocyanates.

Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether polyols obtained by ring-opening copolymerisation of alkylene oxides, such as ethylene oxide and/or propylene oxide, with isocyanate-reactive initiators of functionality 2 to 8. Preferably the polyether polyols are based on propylene oxide, optionally in combination with up to 20 wt % (based on total alkylene oxides) of ethylene oxide. Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebacic acid, and the like can be given.

The method according to the invention may be used to provide polyurethane or polyurea (PU) foams such as flexible PU foam, semirigid PU foam, rigid PU foam, viscoelastic PU foam, integral skin PU foam, hydroponic PU foam and alike. In particular it is useful in PU foam applications such as mattresses, bedding foam and automotive PU foam, in particular conventional flex foam, HR flex foam, visco elastic flex foam, but also semi rigid and rigid foam.

The independent and dependent claims set out particular and preferred features of the invention. Features from the dependent claims may be combined with features of the independent or other dependent claims as appropriate.

The above and other characteristics, features and advantages of the present invention will become apparent from the following detailed description which illustrate, by way of example, the principles of the invention. This description is given for the sake of example only, without limiting the scope of the invention.

The present invention is described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

In the context of the present invention the following terms have the following meaning:
1) Unless otherwise indicated, reference to % w, w % or percentage by weight of a given component refers to the weight of said component, expressed as percentage, over the total weight of the composition in which said component is present at that moment in time.
2) The CERTIPUR test method is an emission measurement method to measure the emissions from a foam sample done in a 1 m³ chamber where the foam is exposed to 23° C. and 50% RH for several hours.
3) The VDA 276 test method is an emission measurement method to measure the emissions from a foam sample done in a 1 m³ chamber where the foam is exposed to 65° C. and 5% RH for several hours. VDA 276 (Verband Der Automobil industrie) is a specific automotive emission method used by a host of automotive OEM's (original equipment manufacturers) to specify the permissible emission levels coming from automotive interior parts.
4) isocyanate index or NCO index or index: the ratio of NCO-groups over isocyanate-reactive hydrogen atoms present in a formulation, given as a percentage:

$$\frac{[NCO] \times 100}{[active - H]} (\%)$$

In other words the NCO-index expresses the percentage of isocyanate actually used in a formulation with respect to the amount of isocyanate theoretically required for reacting with the amount of isocyanate-reactive hydrogen used in a formulation.

EXAMPLES

An isocyanate reactive composition was provided comprising
100 gram of a glycerine initiated tri functional polyol with average MW of 6000. EO content is 15%, PO content is 85%.
4 gram water
0.1 gram N,N,N'-trimethyl-N'-hydroxyethyl bisaminoethylether;
1 gram N-(3-dimethylaminopropyl)-N,N-diisopropanolamine;
0.4 gram diethanolamine;
0.9 gram foam stabilizer available as Tegostab B8715LF from Evonik Tegostab B 8715 LF is a low fogging siloxane based surfactant
In comparative example I, no scavenger was added.
In examples II and III, IV and V, respectively 0.05 w %, 0.15 w %, 0.25 w % and 0.30 w % of the ethylene amine was added, the % w based upon the weight of the reactive mixture, i.e. sum of the weights of the polyol, the polyisocyanate and all additives.
In comparative example VI 0.12 w % carbalink HPC, i.e. hydroxypropyl carbamate, was added.
The mixture of ethylene amine components used comprises following components:
12 w % tetraethylene pentamines (TEPA)
38 w % pentaethylene hexamines (PEHA)
22 w % hexaethylene heptamines (HEHA)
13 w % heptaethylene octamines (HEOA)
7 w % octaethylene nonamines (OENO)
8 w % molecules according to the formulae having 10 to 18 nitrogens in its structure.
This mixture is hereinafter referred to as ethylene amine mixture. The average number of nitrogen atoms of ethylene amine mixture is 7.05.
The average molecular weight is 270 g/mol.
This isocyanate reactive compositions are reacted with 64 gram of a polymeric modified MDI variant with NCO value of 32, comprising 2,2 and 2,4 MDI between 47 and 50 w %
4,4 MDI between 56 and 60 w %
pMDI between 11 and 13 w %

The resulting polyurethane foams are subjected to an emission test according to VDA 276 being a test method from the Verband Der Automobil industrie.
The results are listed in table I.

TABLE I

Aldehydes after 5 hours/65° C. according to VDA 276 test method

| Ex. | products used | formaldehyd ppb | Acetaldehyde ppb | propionaldehyd ppb | VDA 278 |
|---|---|---|---|---|---|
| 1 | BLANCO | 183 | 8 | 29 | pass |
| 2 | Ethylene amine mixture (0.05%) | 16 | 11 | 22 | pass |
| 3 | Ethylene amine mixture (0.15%) | 0 | 28 | 20 | pass |
| 4 | Ethylene amine mixture (0.25%) | 0 | 35 | 21 | pass |
| 5 | Ethylene amine mixture (0.30%) | 0 | 35 | 22 | pass |
| 6 | CARBALINK HPC (0.12%) | 142 | 11 | 27 | no pass |

A second set of examples were prepared using the same formulation of the reaction mixture, except that following scavengers were added:

Example 7: Blanco—no scavenger
Example 8: scavenger triethylene tetramine (TETA)—0.15% w
Example 9: scavenger tetraethylene pentamine (TEPA)—0.15% w
Example 10: scavenger tetraethylene pentamine (TEPA)—0.03% w The results are listed in table II.

TABLE II

Aldehydes after 5 hours/65° C. according to VDA 276 test method

| Ex. | products used | formaldehyd ppb | Acetaldehyde ppb | propionaldehyd ppb |
|---|---|---|---|---|
| 7 | BLANCO | 80 | 4 | 24 |
| 8 | TETA (0.15%) | 0.15 | 22 | 25 |
| 9 | TEPA (0.15%) | 0 | 24 | 25 |
| 10 | TEPA (0.03%) | 76 | 1.5 | 28 |

Similar reaction mixture as for examples 1 and 4 were prepared using the same components, however with an other ISO-index.
The obtained foams were subjected to different tests to determine the influence of the scavenger on the physical properties. The results were summarized in table III.

TABLE III

| Standard | Property | blanco Index 80 | blanco Index 90 | 0.25% w ethylene amine mixture Index 80 | 0.25% w ethylene amine mixture Index 90 |
|---|---|---|---|---|---|
| DIN EN ISO 845 | Density (kg/m$^3$) | 82 | 80.1 | 80.8 | 78.9 |
| DIN EN ISO 1856 | 50% compression set | | | | |
| | Init (%) | 5.3 | 3.9 | 5.7 | 4.3 |
| | HACS (90 C./100% RH, 200 hr) (%) | 6.9 | 6.5 | 6.7 | 7.0 |
| DIN EN ISO 3386-1 | Foam hardness (40%) | | | | |
| | Init (kPa) | 5.0 | 6.2 | 4.3 | 6.0 |
| | HA foam hardness (kPa) | 3.4 | 4.4 | 3.0 | 4.4 |
| | Change (%) | −32 | −29 | −31 | −27 |
| DIN EN ISO 1798 | Tensile strength | | | | |
| | Init (kPa) | 78.2 | 80.4 | 92.9 | 101.6 |
| | Dry HA (kPa) | 69.9 | 95.1 | 82.4 | 89.4 |
| | Wet HA (kPa) | 59.5 | 87. | 78.0 | 96.0 |
| | Elongation | | | | |
| | Init (%) | 97.6 | 84.3 | 107.0 | 94.4 |
| | Dry HA (%) | 91.8 | 90.8 | 102.4 | 92.8 |
| | Wet HA (%) | 127.8 | 129.6 | 133.1 | 133.4 |
| DIN EN ISO 1856 | 50% compression set | | | | |
| | Init (%) | 5.3 | 3.9 | 5.7 | 4.3 |
| | HACS (120 C./100% RH, 15 hr) (%) | 15.7 | 14.2 | 7.2 | 14.9 |
| | Dry HA (7 days at 140 C.) (%) | 7.1 | 5.6 | 7.3 | 6.5 |

Further experiments were performed to illustrate the emission values obtained after performing the VDA 276 test method in samples according to the invention compared to samples according to the prior art.

Formulations Used:
- 8966-10A: This is the reference foam formulation containing no primary and no secondary amines to scavenge formaldehydes in the foam.
- 8966-10B: In this formulation, a masterbatch according to WO2009/117479 was made. A primary amine containing compound DMAPA (=dimethylaminopropyl amine) was added to an tertiary amine (=JEFFCAT® ZF-10) in a weight ratio of 10/90.
- 8966-11C: In this formulation, a masterbatch according to WO2009/117479 was made. An amine compound containing at least 1 primary amine and at least one secondary amine was added to a tertiary amine (JEFFCAT® ZF-10) in a weight ratio of 10/90.
- 8966-10D: This formulation was made according to the invention. A compound containing at least one primary amine and at least one secondary amine is added to the isocyanate reacting mixture.

All foams were made by hand mixing the components for 5 seconds at 2000 rpm. The reacting mixture was then poured in a 6.5 liter open mold. After approximately two hours of curing at room temperature, the foams (3×350 grams) were taken out of the mold, crushed and put in a TEDLAR/ALU bag and sealed.

The composition of the formulation used to make the foams are summarized in Table IV below.

TABLE IV

| Formulation | 8966-10A | 8966-10B | 8966-10C | 8966-10D |
|---|---|---|---|---|
| Daltocel F477 | 100 | 100 | 100 | 100 |
| Daltocel F 526 | 4 | 4 | 4 | 4 |
| water | 4 | 4 | 4 | 4 |
| Jeffcat ZF10 | 0.1 | | | 0.1 |
| Jelfcat DPA | 1 | 1 | 1 | 1 |
| Diethanolamine | 0.25 | 0.25 | 0.25 | 0.25 |
| Tegostab B 8734 LF2 | 0.9 | 0.9 | 0.9 | 0.9 |
| sum | 110.25 | 110.15 | 110.15 | 110.25 |
| Isocyanate (MDI) | 54-60 | 54-60 | 54-60 | 54-60 |
| INDEX | 80-90 | 80-90 | 80-90 | 80-90 |
| Aldehyde scavenger blend | | | | |
| DMAPA/ZF-10 (10/90) | | 0.11 | | |
| aldehyde scavenger/ZF-10 (10/90) | | | 0.11 | |
| aldehyde scavenger/Tertiary amine (80/20) | | | | 0.3 |
| REACTIVITY | | | | |
| String time (seconds) | 80 | 80 | 80 | 77 |
| End of rise (seconds) | 85 | 85 | 85 | 83 |
| Blow off (seconds) | 85 | 85 | 85 | 83 |
| observations | nice | nice | nice | nice |

Each foam system (3×350 grams) was then submitted to respectively the CERTIPUR and VDA 276 test method. The aldehyde emissions were measured and quantified. The emissions measured are summarized in Table V below.

TABLE V

| | 8966-10A 2 HR | 8966-10A 5 HR | 8966-10B 2 HR | 8966-10B 5 HR | 8966-10C 2 HR | 8966-10C 5 HR | 8966-10D 2 HR | 8966-10D 5 HR |
|---|---|---|---|---|---|---|---|---|
| aldehydes emissions (VDA 276) - μg/m$^3$ at 65 C./5% RH | | | | | | | | |
| formaldehyde | 239.5 | 190.2 | 205.1 | 179 | 219.5 | 153.6 | 23.6 | 20.6 |
| acetaldehyde | 9.4 | 10.4 | 9.29 | 8.91 | 19.5 | 10.6 | 41.9 | 27.5 |
| proprionaldehyde | 48 | 47.7 | 53.6 | 46.7 | 102.6 | 53.1 | 64.8 | 52.8 |
| aldehydes emissions (CERTIPUR) - μg/m$^3$ at 23 C./50% RH | | | | | | | | |
| formaldehyde | 8.4 | 8.6 | 8.9 | 7.2 | 7.4 | 9.7 | 3.2 | 2.8 |
| acetaldehyde | 30.6 | 11.2 | 29.9 | 8.8 | 23 | 10.5 | 37.7 | 25.7 |
| proprionaldehyde | 91.7 | 45.6 | 98.7 | 42 | 80.2 | 50.8 | 77.7 | 35.5 |

Foams submitted to the CERTIPUR emission method do NOT show a significant change in formaldehyde emissions when using formulations according to WO2009/117479. (example 8966-10B and 8966-10C)

When measuring the foam emissions according to the VDA 276 method, the formaldehyde emission are seen in large quantities. On average a ten to twenty fold increase in formaldehyde is recorded compared to the emissions seen according to the CERTIPUR method.

This implies that the formaldehyde must be generated/formed in the foam at these conditions. Using the formulations according to WO2009/117479 will not lower the formaldehyde emissions in the foams.

The lowering of the formaldehyde emissions is seen only when employing the formulations according to the present invention (example 8966-10D)

It is to be understood that although preferred embodiments and/or materials have been discussed for providing embodiments according to the present invention, various modifications or changes may be made without departing from the scope and spirit of this invention.

The invention claimed is:

1. A composition, comprising:
   at least one component selected from the group consisting of a polyether polyol, a polyester polyol, a polyether polyamide and a polyester polyamide;
   N-(3-dimethylaminopropyl)-N,N-diisopropanolamine; and
   one or more amine components having a structure according to one of the formulae:

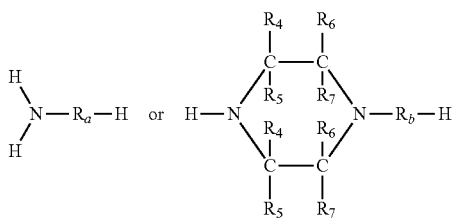

wherein $R_a$ comprises 3 to 17 nitrogen atoms, $R_b$ comprises 2 to 16 nitrogen atoms and each of $R_a$ and $R_b$ independently comprises a plurality of units selected from at least one of R1, R2, and R3, combined in a random sequence, wherein:

R1 is

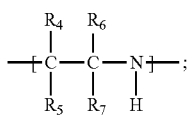

R2 is

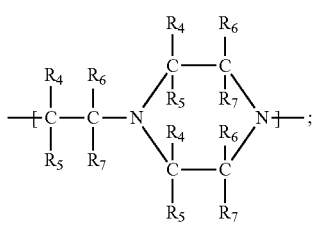

and R3 is

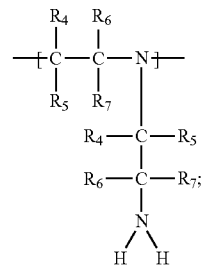

wherein each of $R_4$, $R_5$, $R_6$ and $R_7$ individually are —H or —CH$_3$; and wherein the amount of the one or more amine components in the composition is between 0.05% wt and 1% wt calculated on the total weight of the composition.

2. A composition according to claim 1, wherein the average number of nitrogen atoms of said one or more amine components is in the range of 6 to 10.

3. A composition according to claim 2, wherein the average number of nitrogen atoms of said one or more amine components is in the range of 6 to 8.

4. A composition according to claim 1, wherein said one or more amine components comprise at least one component comprising at least two primary amine groups and at least one secondary amine group.

5. A composition according to claim 1, wherein $R_4$, $R_5$, $R_6$ and $R_7$ are each hydrogen.

6. A composition according to claim 5, wherein said one or more amine components is a mixture comprising at least one of triethyltetramine (TETA), tetraethylpentamine (TEPA), pentaethylhexamine (PEHA), hexaethylheptamine (HEHA), heptaethyloctamine (HEOA), and octaethylenenonamine (OENO).

7. A method for reducing the emission of at least one of formaldehyde and acetaldehyde from a polyurethane or polyurea foam, by using a composition comprising (i) N-(3-dimethylaminopropyl)-N,N-diisopropanolamine, and (ii) one or more amine components as an additive in a reaction mixture to produce said polyurethane or polyurea foam, each of said one or more amine components having a structure according to one of the formulae

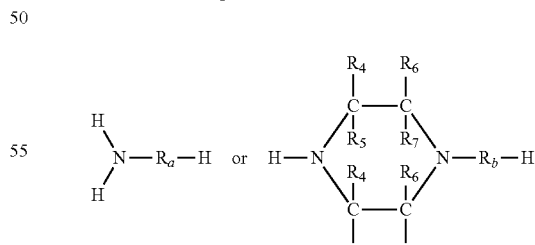

wherein $R_a$, comprises 3 to 17 nitrogen atoms, $R_b$ comprises 2 to 16 nitrogen atoms and each of $R_a$ and $R_b$ independently comprises a plurality of units selected from at least one of R1, R2, and R3, combined in a random sequence, wherein:

R1 is

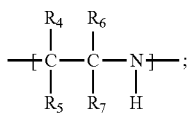

R2 is

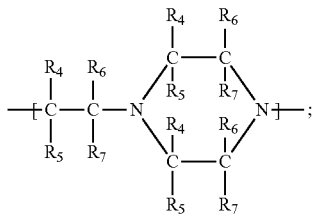

and R3 is

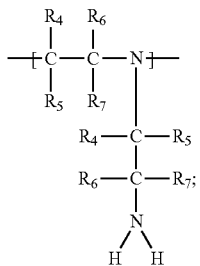

wherein each of $R_4$, $R_5$, $R_6$ and $R_7$ individually are —H or —$CH_3$; and wherein the amount of the one or more amine components in the composition is between 0.05% wt and 1% wt calculated on the total weight of the composition.

8. A method according to claim 7, wherein the average number of nitrogen atoms of said one or more amine components is in the range of 6 to 10.

9. A method according to claim 7, wherein said one or more amine components are amine components with formula

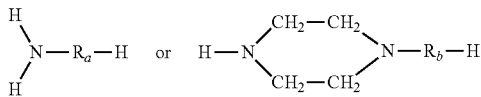

wherein each of $R_a$ and $R_b$ is independently a random sequence of at least one of units R1, R2 and R3, wherein:

R1 is

R2 is

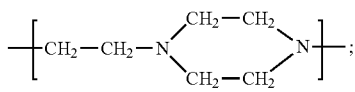

and R3 is

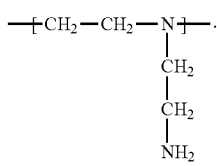

10. A method according to claim 7, wherein said reaction mixture further comprises at least one isocyanate component; at least one isocyanate reactive component comprising one or more reactive hydrogen atoms, wherein the at least one isocyanate reactive component is selected from a polyether polyol, a polyester polyol, a polyether polyamide and a polyester polyamide; catalysts selected from the group consisting of blowing and gelling catalysts; and optionally, fire retardants, antioxidants, surfactants, physical or chemical blowing agents, fillers, or pigments.

11. A method according to claim 7, wherein said one or more amine components is provided to the reaction mixture as part of the isocyanate reactive component.

12. A composition, comprising:
at least one component selected from the group consisting of a polyether polyol, a polyester polyol, a polyether polyamide and a polyester polyamide;
N-(3-dimethylaminopropyl)-N,N-diisopropanolamine; and
an amine selected from triethyltetramine (TETA), tetraethylpentamine (TEPA), pentaethylhexamine (PEHA), hexaethylheptamine (HEHA), heptaethyloctamine (HEOA), and octaethylenenonamine (OENO),
wherein the amine is present in the composition in an amount between 0.05% wt. and 1% wt. calculated on the total weight of the composition.

* * * * *